(12) United States Patent
Sprenger et al.

(10) Patent No.: US 9,555,597 B2
(45) Date of Patent: Jan. 31, 2017

(54) FOAM CORE CHASSIS

(71) Applicant: INTEL CORPORATION, Santa Clara, CA (US)

(72) Inventors: Mark E. Sprenger, Folsom, CA (US); Paul J. Gwin, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/728,829

(22) Filed: Dec. 27, 2012

(65) Prior Publication Data

US 2014/0184043 A1  Jul. 3, 2014

(51) Int. Cl.
| | |
|---|---|
| *B32B 5/18* | (2006.01) |
| *B32B 3/04* | (2006.01) |
| *G06F 1/16* | (2006.01) |
| *B32B 15/04* | (2006.01) |
| *B32B 27/06* | (2006.01) |

(52) U.S. Cl.
CPC . *B32B 5/18* (2013.01); *B32B 3/04* (2013.01); *B32B 15/046* (2013.01); *B32B 27/065* (2013.01); *G06F 1/1656* (2013.01); *B32B 2307/54* (2013.01); *B32B 2307/542* (2013.01); *B32B 2307/56* (2013.01); *B32B 2307/718* (2013.01); *B32B 2457/00* (2013.01); *Y10T 428/1376* (2015.01)

(58) Field of Classification Search
CPC ............ B32B 5/18; B32B 3/04; B32B 15/046; B32B 27/065; B32B 2307/54; B32B 2307/542; B32B 2307/718
USPC ................................................... 361/679.34
See application file for complete search history.

(56) References Cited

U.S. PATENT DOCUMENTS

| | | | |
|---|---|---|---|
| 6,320,744 B1 * | 11/2001 | Sullivan et al. ......... | 361/679.34 |
| 7,315,447 B2 * | 1/2008 | Inoue ...................... | G06F 1/184 |
| | | | 174/544 |
| 7,672,117 B1 | 3/2010 | Gary et al. | |
| 2003/0043541 A1 * | 3/2003 | Yuasa .................... | A01N 25/10 |
| | | | 361/679.54 |
| 2003/0161093 A1 * | 8/2003 | Lam ...................... | G06F 1/1616 |
| | | | 361/679.24 |
| 2005/0270733 A1 | 12/2005 | Lam et al. | |

(Continued)

FOREIGN PATENT DOCUMENTS

| | | |
|---|---|---|
| CN | 1652245 A | 8/2005 |
| JP | 2012-101218 A | 5/2012 |

(Continued)

OTHER PUBLICATIONS

International Search Report and Written Opinion received for PCT Patent Application No. PCT/US2013/077065, Mailed on Apr. 9, 2014, 13 pages.

(Continued)

*Primary Examiner* — Eric Thomas
*Assistant Examiner* — Michael P McFadden
(74) *Attorney, Agent, or Firm* — Schwabe, Williamson & Wyatt, P.C.

(57) ABSTRACT

An apparatus and computing device are described herein. The apparatus includes a chassis cover of a computing device. The apparatus also includes a foam core. Furthermore, the foam core is in contact with a surface of the chassis cover of the computing device.

13 Claims, 3 Drawing Sheets

(56) References Cited

U.S. PATENT DOCUMENTS

| | | | |
|---|---|---|---|
| 2007/0206365 A1* | 9/2007 | Shiu | H05K 3/284 |
| | | | 361/752 |
| 2010/0270052 A1* | 10/2010 | Crohas | B29C 45/14 |
| | | | 174/50 |
| 2010/0276495 A1* | 11/2010 | Goldstein | B29C 44/1228 |
| | | | 235/488 |
| 2011/0063795 A1 | 3/2011 | Yeh et al. | |

FOREIGN PATENT DOCUMENTS

| | | |
|---|---|---|
| KR | 10-2006-0004406 A | 1/2006 |
| WO | 2014/105730 A1 | 7/2014 |

OTHER PUBLICATIONS

Search Report for R.O.C. Patent Application No. 102144199, mailed Oct. 16, 2015, 1 page.

\* cited by examiner

100

200

300

FOAM CORE CHASSIS

TECHNICAL FIELD

The present embodiment relates generally to a rigid chassis for a computing device. More specifically, the present embodiment relates to a rigid chassis with a foam core.

BACKGROUND ART

Computing devices typically include a housing or enclosure that contains the electrical components of the computing device. The housing or enclosure may also be referred to as a chassis. The size and shape of the chassis are typically dictated by the components contained within the chassis. The chassis may also be made using a variety of materials, include steel, plastic, aluminum, magnesium, or continuous fiber reinforced resin consisting of Thermoset Epoxy or Thermoplastic.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
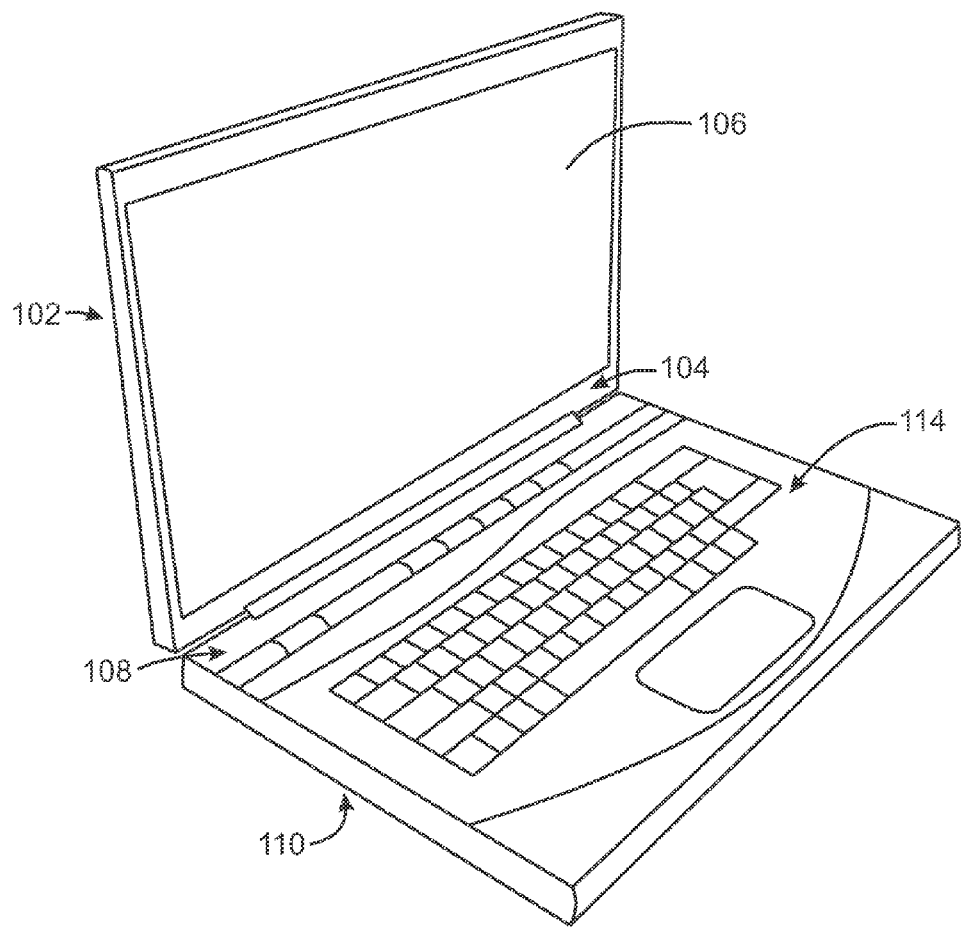
FIG. 1 is a diagram of a chassis, in accordance with embodiments of the present techniques.

As discussed above, a computing chassis may be made from a variety of materials, including plastic, steel, aluminum, magnesium, composite, or any combination thereof. Skin is another term used to describe the chassis. Thin computing systems typically include a sleek and slim plastic or metal chassis. However, the plastic chassis used in thin systems do not provide firm and rigid support for the electrical components within the chassis. Depending on the forces exerted on the exterior of the chassis, the entire plastic chassis will flex and bend. The flexible, bending nature of the plastic chassis leads to a weak, flimsy feeling when held by a user. Low modulus of elasticity contributes to the flimsy feeling, and results from a low Area Moment of Inertia. One way to increase the Area Moment of Inertia is by rigidly attaching the top and bottom skins to each other, reducing relative movement between the skins. A foam core is an effective way to increase the Area Moment of Inertia because the foam core makes a rigid structure when bonded between two flat skins, even though the foam core is made from flexible materials.

One way to attach the bottom and top skins together is to use structural fasteners, such as screws or heat stakes. This minimizes relative movement between the skins, which increases the Area Moment of Inertia, and hence, the stiffness of the structure. However, screws and heat stakes are typically fastened to structures, such as bosses and through holes. These structures reduce the volume of space available for the electronic components of the device. Further, the lighter, thinner, and increased display sizes of computing systems may not allow for bosses and screws to be freely used to create a firm, rigid system. Thus, the resulting devices flex and bends when pressure is exerted on the chassis, creating a perception of low quality for potential buyers of the system.

Embodiments described herein provide a foam core chassis for computing systems. The foam core increases the rigidness of a computing system without the need for additional structural features to allow for fasteners or heat stakes. The chassis covers may serve as beam members. Additionally, the chassis covers can serve as tensile members if combined in a composite sandwich structure. Such a configuration will greatly increase chassis stiffness as the skins of the chassis are transformed to efficient tension or compression members. Further, any relative translational movement between the covers is reduced by the foam core. Advantageously, the foam core rigidly combines the two skins together in a structural composite that is much more rigid than the skins alone, allowing for thinner skins. Further, such skins are more dent resistant than a base metal without foam core, and resists deflection under compression (someone pushing on the top cover for instance). Additionally, the chassis can be designed without typical features used to make the skins rigid, i.e., screws specifically designed in to make the structure rigid.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a diagram of a chassis 100, in accordance with embodiments of the present techniques. The chassis 100 includes a top A-cover 102, a B-cover 104, and a display glass 106. Although not shown, the top A-cover 102 extends throughout the full topside of the B-cover 104 and the display glass 106. The chassis 100 also includes a C-cover 108 and a D-cover 110. Although not shown, the D-cover extends throughout the full backside of the C-cover 108 and the D-cover 110.

It is noted that the chassis 100 is merely one example of an embodiment of the claimed subject matter. The chassis 100 may also be used for a, server computer, thin laptop, a high volume low cost computing system, a tablet computer, a mobile computing device, such as a personal computer (PC), laptop computer, ultra-laptop computer, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like. To create a rigid structure, a low pressure expandable foam may be injected inside the chassis to form a composite structure in conjunction with the chassis of a partially built system. Low pressure expandable foam is a foam that will expand once it is exposed to air. The pressure exerted by the foam on the components of the electrical device within the chassis is negligible. In embodiments, a mass of the unexpanded polymer is deposited within a volume. The polymer will expand until it fills all the voids within the volume, as it transforms to a foamed polymer. Low pressure expandable foam will not exert large pressures on the internal structure, when it contacts the internal surface it will off gas $CO_2$. The foam will adhere to every surface it contacts to create a rigid foam filled structure. The use of low pressure foam enables the injection of this foam in closed volumes. By injecting the foam into closed volumes, a manufacturer may use simple dam-and-fill techniques which eliminate the need to trim over expanded foam after injection. In a dam-and-fill technique, dams may be created throughout the chassis to prevent foam from entering volumes where desired. The foam may then be filled within the areas of the dam, without having to trim excess foam.

Advantageously, embodiments enable the creation of a computer chassis without the use of screws specifically configured for stiffness. Further, such chassis minimize the relative movement between covers.

Figure 2:
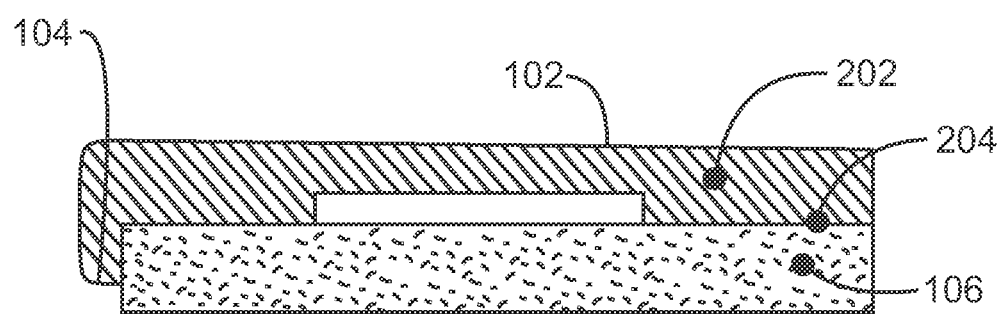
FIG. 2 is a diagram of a foam core chassis within a top A-cover and a B-cover, in accordance with embodiments.

FIG. 2 is a diagram of a foam core chassis 200 within a top A-cover and a B-cover, in accordance with embodiments. As discussed above, the top A-cover 102 and the B-cover 104 form the portion of the chassis that houses the display glass 106. As shown in FIG. 2, a foam core 202 can be inserted within the core of the chassis to provide a rigid structure. Although the foam core 202 is shown as being in contact with the entire top A-cover 102 and the B-cover 104, in embodiments the foam core may not be in complete contact with the top A-cover 102 and the B-cover 104. Advantageously, the rigid foam core contacts the A/B covers where necessary to counteract bending moments. In this way, there is enough contact and adhesion between the foam and covers to secure the A/B covers together.

Accordingly, the foam core 202 enables the top A-cover 102 and the B-cover 104 to function as a single structural element. As structural members of the chassis, the top A-cover 102 and the B-cover 104 experience various stresses as a result of applied loads. The foam core 202 is used to share the resulting stresses. In embodiments, the resulting stresses on the chassis includes shear, compressive, tensile, or any combination thereof.

Within the foam core chassis 200 there may also be a masking sheet 204 between the foam and various electrical components. In embodiments, the masking sheet is thin, e.g., 0.05 mm thick. Masking can be done in many forms and with many different thicknesses. The masking sheet 204 prevents the foam core from adhering to electrical components within the chassis 200. The masking sheet 200 may be applied anywhere within the chassis 200 in order to prevent adhesion by the foam. Moreover, the masking sheet may be made of any material.

Figure 3:
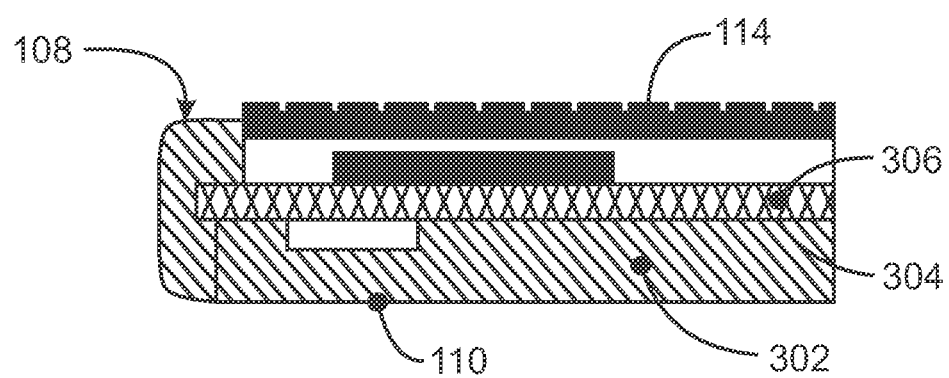
FIG. 3 is a diagram of a foam core chassis within a C-cover and a D-cover, in accordance with embodiments.

FIG. 3 is a diagram of a foam core chassis 300 within a C-cover and a D-cover, in accordance with embodiments. As discussed above, the C-cover 108 and the D-cover 110 form the portion of the chassis that houses the keyboard 114. As shown in FIG. 3, a foam core 302 can be formed within the core of the chassis to provide a rigid structure. Although the foam core 302 is shown as being in contact with the entire C-cover 108 and the D-cover 110, in embodiments the foam core may not be in complete contact with the top C-cover 108 and the D-cover 110. However, a rigid foam core is still provided.

Accordingly, the foam core 302 enables the top C-cover 108 and the D-cover 110 to function as beams of the chassis 300, as described above with respect to claim 2. Accordingly, as beams of the chassis, the C-cover 108 and the D-cover 118 experience various stresses, such as shear, compressive, tensile, or any combination thereof, as a result of the loads applied. Similar to FIG. 2, within the foam core chassis 300 there may also be masking 304 between the foam and various electrical components, such as the printed circuit board 306. In embodiments, the masking is 0.05 mm thick. The masking 304 may prevents the foam core 302 from adhering to electrical components within the chassis 300, such as the printed circuit board 304. The masking sheet 300 may also be applied anywhere within the chassis 300 in order to prevent adhesion by the foam.

In embodiments, the top and bottom covers of the chassis 200 or the chassis 300 become true tension and compression members, which increases the stiffness of the chassis structure as described above. Further, the foam core prevents three direction translation of the covers of the chassis, greatly increasing the rigidity of the top and bottom tension members. Moreover, screws and features used to obtain stiffness by preventing cover joint slip can be eliminated, increasing space within the chassis for the various electrical components. Accordingly, in embodiments, joint slip between covers of the chassis is prevented.

The chassis compressive strength is also increased by the addition of a foam core. As a result, squeezing the chassis by hand is not an issue when the chassis includes a foam core. The present techniques also enable thinner covers that can provide adequate stiffness, reducing material cost and weight. Accordingly, in embodiments, the present techniques may be used in high volume, low cost systems.

Dent resistance from impact is increased with the addition of a foam core. The increased dent resistance eliminates the denting and deformation of surfaces associated with thin metal covers and still achieves the stiffness. Further, any high volume, low cost system will also experience increased dent resistance when compared to a computing system made from the same materials without a foam core. This rigid structure will not deflect easily when pressed, thereby giving it a perception of high quality over and above currently available like systems.

The foam core used in the present techniques is not limited to a low pressure expandable foam. In embodiments, the foam may be pre-formed and inserted and bonded in place in the chassis as a solid core. Further, the foam may not be in complete contact with the covers of the chassis. The foam core may include sections of foam placed at strategic places throughout the chassis in order to enable a rigid chassis.

Example 1

An apparatus is described herein. The apparatus includes a chassis cover of a computing device and a foam core. The foam core is in contact with a surface of the chassis cover of the computing device.

Example 2

A computing device is described herein. The computing device includes a chassis cover and a foam core. The foam core is in contact with a surface of the chassis cover.

Example 3

A foam core is described herein. A computer housing surrounds the foam core. Also, the foam core is used to provide support for the computer housing.

It is to be understood that specifics in the aforementioned examples may be used anywhere in one or more embodiments. For instance, all optional features of the computing device described above may also be implemented with respect to either of the methods described herein. Furthermore, although flow diagrams may have been used herein, embodiments are not limited to those diagrams or to the corresponding descriptions herein. For example, flow need not move through each illustrated box or state or in exactly the same order as illustrated and described herein.

The embodiments are not restricted to the particular details listed herein. Indeed, those skilled in the art having the benefit of this disclosure will appreciate that many other variations from the foregoing description and drawings may be made within the scope of the present embodiments. Accordingly, it is the following claims including any amendments thereto that define the scope of the embodiments.

What is claimed is:

1. An apparatus, comprising:
   a top and a bottom chassis cover to mate with each other, to provide a thin profile for the apparatus, wherein the top and bottom chassis covers are formed of a first material with a first property that results in the top and bottom chassis covers being flexible;
   a keyboard disposed on the top chassis cover;
   a printed circuit board disposed between the keyboard and the bottom chassis cover; and
   an adhesive foam core that fills a first and a second end volume between the top and the bottom chassis cover, and a bottom volume bounded by a surface of the bottom chassis cover and an entire bottom surface of the printed circuit board, wherein a portion of the adhesive foam core that fills the bottom volume adheres to the chassis cover and the printed circuit board;
   wherein a top volume between a substantial extent of a top surface of the printed circuit board and the keyboard does not include the foam core; and
   wherein the adhesive foam core is formed of a second material with a second property that provides sufficient rigidity to the apparatus, with filling only the first and second end volumes and the bottom volume, but not the top volume, to prevent the chassis covers from excessive flexing that causes damages to the printed circuit board when the keyboard is used resulting in stress being imparted on the flexible chassis covers.

2. The apparatus of claim 1, further comprising masking that prevents foam adhesion to electrical components of the apparatus.

3. The apparatus of claim 1, wherein the foam core is formed using a low pressure expandable foam.

4. The apparatus of claim 1, wherein the foam core is formed using a preformed foam.

5. The apparatus of claim 1, wherein the foam core is formed with injection of the second material into the first and second end volumes and the bottom volume, using a dam-and-fill technique.

6. The apparatus of claim 1, wherein the foam core enables removal of bosses and screws from the top and bottom chassis covers.

7. A computing device, comprising:
   a top and a bottom chassis cover to mate with each other, to provide a thin profile for an apparatus of the computing device, wherein the top and bottom chassis covers are formed of a first material with a first property that results in the top and bottom chassis covers being flexible;
   a keyboard disposed on the top chassis cover;
   a printed circuit board disposed between the keyboard and the bottom chassis cover; and
   a foam core that fills a first and a second end volume between the top and the bottom chassis cover, and a bottom volume bounded by a surface of the bottom chassis cover and an entire bottom surface of the printed circuit board, wherein a portion of an adhesive foam core that fills the bottom volume adheres to the chassis cover and the printed circuit board;
   wherein a top volume between a substantial extent of a top surface of the printed circuit board and the keyboard does not include the foam core; and
   wherein the foam core is formed of a second material with a second property that provides sufficient rigidity to the computing device, with filling only the first and second end volumes and the bottom volume, but not the top volume, to prevent the chassis covers from excessive flexing that causes damages to the printed circuit board when the keyboard is used resulting in stress being imparted on the flexible chassis covers.

8. The computing device of claim 7, further comprising a masking sheet prevents foam adhesion to electrical components of the computing device.

9. The computing device of claim 7, wherein the foam core is formed using a low pressure expanded foam.

10. The computing device of claim 7, wherein the foam core is formed using a preformed foam.

11. The computing device of claim 7, wherein the foam core is formed with injection of the second material into the first and second end volumes and the bottom volume, using a dam-and-fill technique.

12. The computing device of claim 7, wherein the foam core enables the removal of bosses and screws from the top and bottom chassis covers.

13. The computing device of claim 7, wherein the foam core prevents a three way translation of the top and bottom chassis covers.

* * * * *